United States Patent
Alberth, Jr. et al.

(10) Patent No.: US 7,620,398 B2
(45) Date of Patent: Nov. 17, 2009

(54) METHOD AND APPARATUS FOR SIMULTANEOUSLY COMMUNICATING ON A VOICE CHANNEL AND BROADCAST CHANNEL

(75) Inventors: William P. Alberth, Jr., Crystal Lake, IL (US); David J. Krause, Hainesville, IL (US)

(73) Assignee: Motorola, Inc., Schaumburg, IL (US)

( * ) Notice: Subject to any disclaimer, the term of this patent is extended or adjusted under 35 U.S.C. 154(b) by 483 days.

(21) Appl. No.: 11/215,916

(22) Filed: Aug. 30, 2005

(65) Prior Publication Data

US 2007/0049272 A1      Mar. 1, 2007

(51) Int. Cl.
  *H04Q 7/20*    (2006.01)
(52) U.S. Cl. ................ 455/435.1; 455/13.4; 455/575.1; 455/575.8; 455/435.3; 370/352; 370/445; 370/282; 370/228
(58) Field of Classification Search .............. 455/435.1, 455/13.4, 575.1, 575.8, 435.3; 370/282, 370/228

See application file for complete search history.

(56) References Cited

U.S. PATENT DOCUMENTS

| | | | | |
|---|---|---|---|---|
| 6,542,517 | B1 * | 4/2003 | Giacalone | 370/465 |
| 6,982,949 | B2 * | 1/2006 | Guo et al. | 370/210 |
| 2003/0112804 | A1 | 6/2003 | Kamarainen et al. | |
| 2004/0152466 | A1 | 8/2004 | Sinnarajah et al. | |
| 2004/0213214 | A1 | 10/2004 | Jung et al. | |
| 2005/0079867 | A1 * | 4/2005 | Balachandran et al. | 455/435.1 |

FOREIGN PATENT DOCUMENTS

WO    WO 2004/112314    12/2004

OTHER PUBLICATIONS 3G 3$^{rd}$ Generation Partnershop Project 2 "3GPP2", 3GPP2 C.R1001-D, Version 1.0, Apr. 18, 2003, p. I-12-2.

* cited by examiner

*Primary Examiner*—Lester Kincaid
*Assistant Examiner*—Charles Shedrick
(74) *Attorney, Agent, or Firm*—Ingrassia, Fisher & Lorenz, P.C.

(57) ABSTRACT

A method and apparatus is provided for simultaneously accessing a broadcast channel which allows for maintaining registration on the broadcast channel and a second channel. The broadcast channel includes a reverse link access channel for a portable communication device (120) to send registration messages to a base station and the method initially includes the step of determining whether a predetermined event requiring registration of the portable communication device on the broadcast channel has been detected (302, 304, 306). After detecting the predetermined event, it is determined whether the portable communication device is communicating on the second channel (308). If not communicating on the second channel (308), registration on the broadcast channel is accomplished by transmitting a registration message on the reverse link access channel (320). If communicating on the second channel (308), the registration message is transmitted on the broadcast channel asynchronously (340) or, if supported by the base station (110), as a databurst of a packet of information on the second channel (330).

20 Claims, 4 Drawing Sheets

METHOD AND APPARATUS FOR SIMULTANEOUSLY COMMUNICATING ON A VOICE CHANNEL AND BROADCAST CHANNEL

FIELD OF THE INVENTION

The present invention generally relates to portable communication devices, and more particularly relates to a method and apparatus for a portable communication device to maintain registration with base stations when a voice channel and a broadcast channel are both in use.

BACKGROUND OF THE INVENTION

Today's portable communication devices have a multitude of functions in addition to the traditional point-to-point audio communications. Modern portable communication devices can receive and transmit multimedia signals, such as photos or videos, with or without accompanying audio. In addition, multimedia signals could be communicated in conventional point-to-point communication or could be broadcast simultaneously to a number of portable communication devices in a communication system. For example, a concert or a sporting event could be broadcast as multimedia signals on a broadcast channel to multiple portable communication devices which have subscribed to such services. The portable communication devices periodically register with base stations in the communication system to continue receiving the broadcasted multimedia signals by transmitting registration messages. Portable communication devices, when receiving such signals on a broadcast channel on a first frequency, may wish to initiate point-to-point communication on a voice channel on a second frequency without terminating reception of the broadcasted signals on the broadcasting channel. However, the transmitter necessary for the point-to-point communication is being utilized to transmit the registration messages necessary to continue receiving the broadcast channel.

Thus, what is needed is a method and apparatus for simultaneously accessing a voice channel and a broadcast channel which allows for maintaining registration on the broadcast channel. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
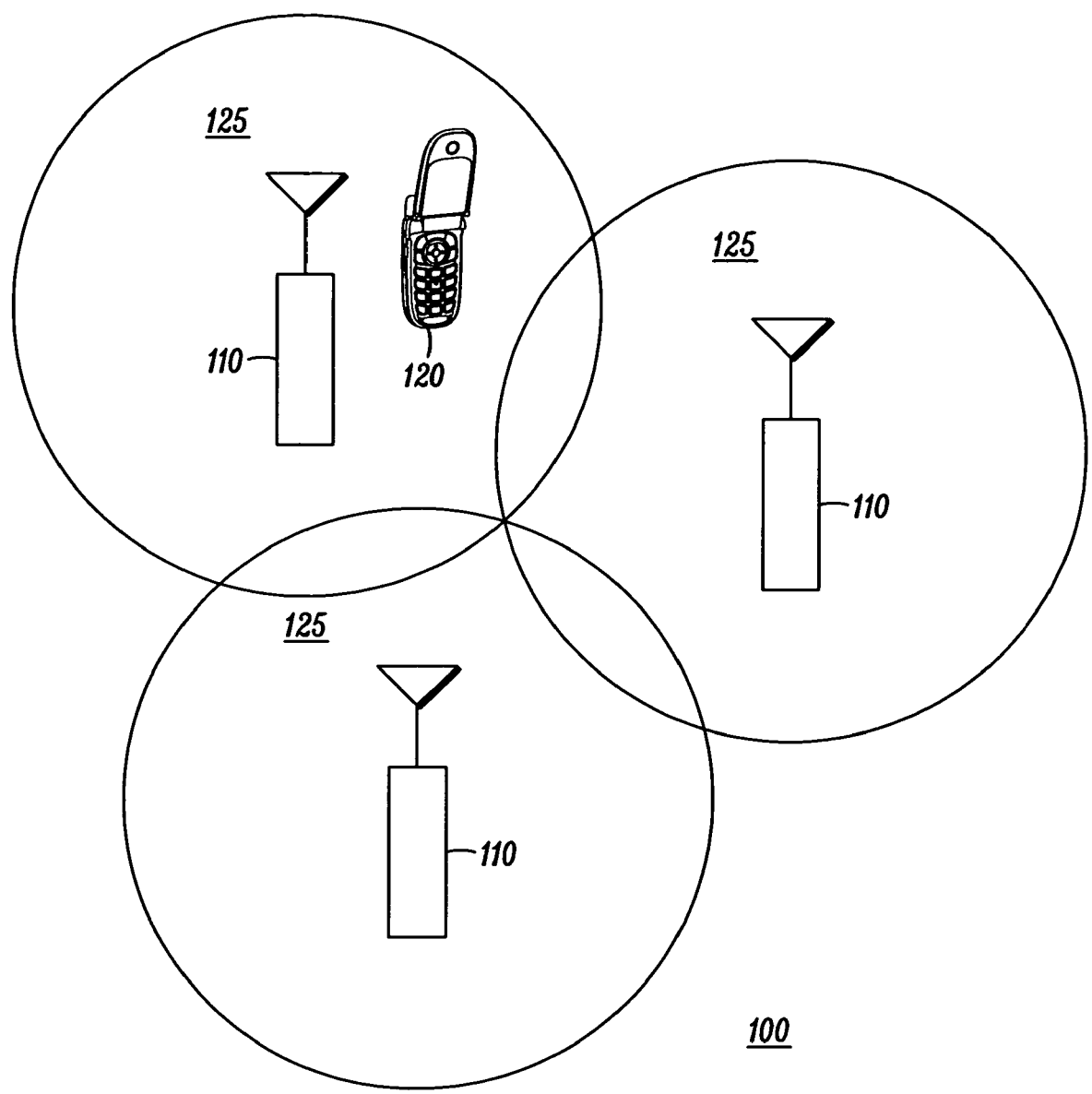
FIG. 1 is a block diagram of a communication system in accordance with an embodiment of the present invention.

A method for simultaneously accessing broadcast communication on a first channel and other communication on a second channel is provided which allows for maintaining registration on the first channel. The first channel includes a reverse link access channel for a portable communication device to send registration messages to a base station and the method initially includes the step of determining whether a predetermined event requiring registration of the portable communication device on the first channel has been detected. The predetermined event may be reception of a message from the base station requiring the portable communication device to register on the first channel, or determination that a predetermined time has passed since a previous registration, or determination that the portable communication device is moving out of a coverage area of the base station. Next, the method in accordance with the present invention, after detecting the predetermined event, determines whether the portable communication device is communicating on a second channel. If not communicating on a second channel, the portable communication device is registered on the first channel by transmitting a registration message on the reverse link access channel. If communicating on the second channel, the portable communication device is registered on the first channel by transmitting a registration message on the second channel, such as transmitting a databurst broadcast registration on the second channel.

When transmitting a databurst broadcast registration on the second channel, a broadcast registration message is first generated. Then the broadcast message is loaded into a databurst container and, thereafter, transmitted as a packet of information multiplexed with other information on the second channel. If the base station rejects databurst registration on the second channel or does not accept databurst communication, the portable communication device is asynchronously registered with the base station by, for example, freezing power control of the transmitter, slewing the transmitter to the first channel frequency, transmitting an asynchronous registration message on the first channel, slewing back to the second channel frequency, and restarting the transmitter power control.

A portable communication device for simultaneously accessing a broadcast channel and another channel is also provided which allows for maintaining registration on the broadcast channel. The portable communication device includes an antenna, first and second receiver circuitry, transmitter circuitry, a transmitter channel selector, user interface devices and a controller. The antenna receives and transmits signals and is coupled to the first receiver circuitry which receives, demodulates and decodes signals on a broadcast channel to derive broadcast information therefrom, the second receiver circuitry which receives, demodulates and decodes signals on a second channel to derive second channel information therefrom, and the transmitter circuitry which encodes, modulates and transmits signals on either a reverse link access channel associated with the broadcast channel or on the second channel. The channel selector is coupled to the transmitter circuitry for selecting either the broadcast reverse link access channel or the second channel for transmitting signals thereon and the user interface devices present the second channel information and the broadcast information to a user and also receive inputs from the user.

The controller is coupled to the first receiver circuitry and the second receiver circuitry for receiving the broadcast and second channel information therefrom and also coupled to the user interface devices for providing the broadcast and second channel information thereto and for receiving the user inputs therefrom. When the controller determines that a predetermined event requiring registration of the portable communication device on the broadcast channel has been detected, it provides a signal to the channel selector to transmit a registration message on the broadcast reverse link access channel if the portable communication device is not communicating on the second channel and provides a signal to the channel selector to transmit a registration message on the second channel if the portable communication device is communicating on the second channel.

A predetermined event requiring registration of the portable communication device on the broadcast channel could be reception of a registration request message, reception of a signal from a timer coupled to the controller indicating that a predetermined time has passed since a previous registration, or reception of a signal from an out of coverage area detector coupled to the first and second receiver circuitry and the controller indicating that the portable communication device is moving out of a coverage area of the base station.

The controller includes a databurst container which generates a packet of information from the registration message and a channel signal power controller for controlling the signal power on the second channel. The controller can then provide the packet of information to the transmitter circuitry for transmission of a databurst broadcast registration as a packet of information multiplexed with the second channel information on the second channel when the portable communication device is communicating on thereon. In addition, when the base station has rejected the databurst broadcast registration on the second channel or if the second channel base station advertises that it will not accept databurst broadcast registrations, the controller transmits the registration message to the base station asynchronously by, for example, (a) freezing the channel signal power controller, (b) signaling the channel selector to switch the transmitter circuitry from the second channel to the reverse link access channel, (c) providing an asynchronous registration message to the transmitter circuitry for transmission on the reverse link access channel therefrom, (d) signaling the channel selector to switch the transmitter circuitry from the reverse link access channel back to the second channel, and (e) restarting the channel signal power controller.

A communication system is also provided which includes a plurality of base stations having a coverage area associated therewith for communicating on broadcast channels and second channels therein with a portable communication device as described above.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a communication system 100 in accordance with an embodiment of the present invention includes a plurality of base stations 110 and a portable communication device 120. The plurality of base stations 110 communicate with the portable communication device 120 on channels for conventional point-to-point communications and on broadcast channels for broadcasting multimedia signals to multiple portable communication devices 120 which have subscribed to such services. Associated with each of the plurality of base stations 110 is a coverage area 125 wherein the portable communication device 120 can receive signals from and transmit signals to such one of the plurality of base stations on either a broadcast channel or another channel. While FIG. 1 depicts a single communication system 100 for supporting both broadcast communication on one channel and other non-broadcast communication on a second channel (e.g. voice communication), the present invention is equally applicable for use in two overlapping communication systems where one system supports broadcast communication and a second communication system supports non-broadcast communication on a second channel.

Figure 2:
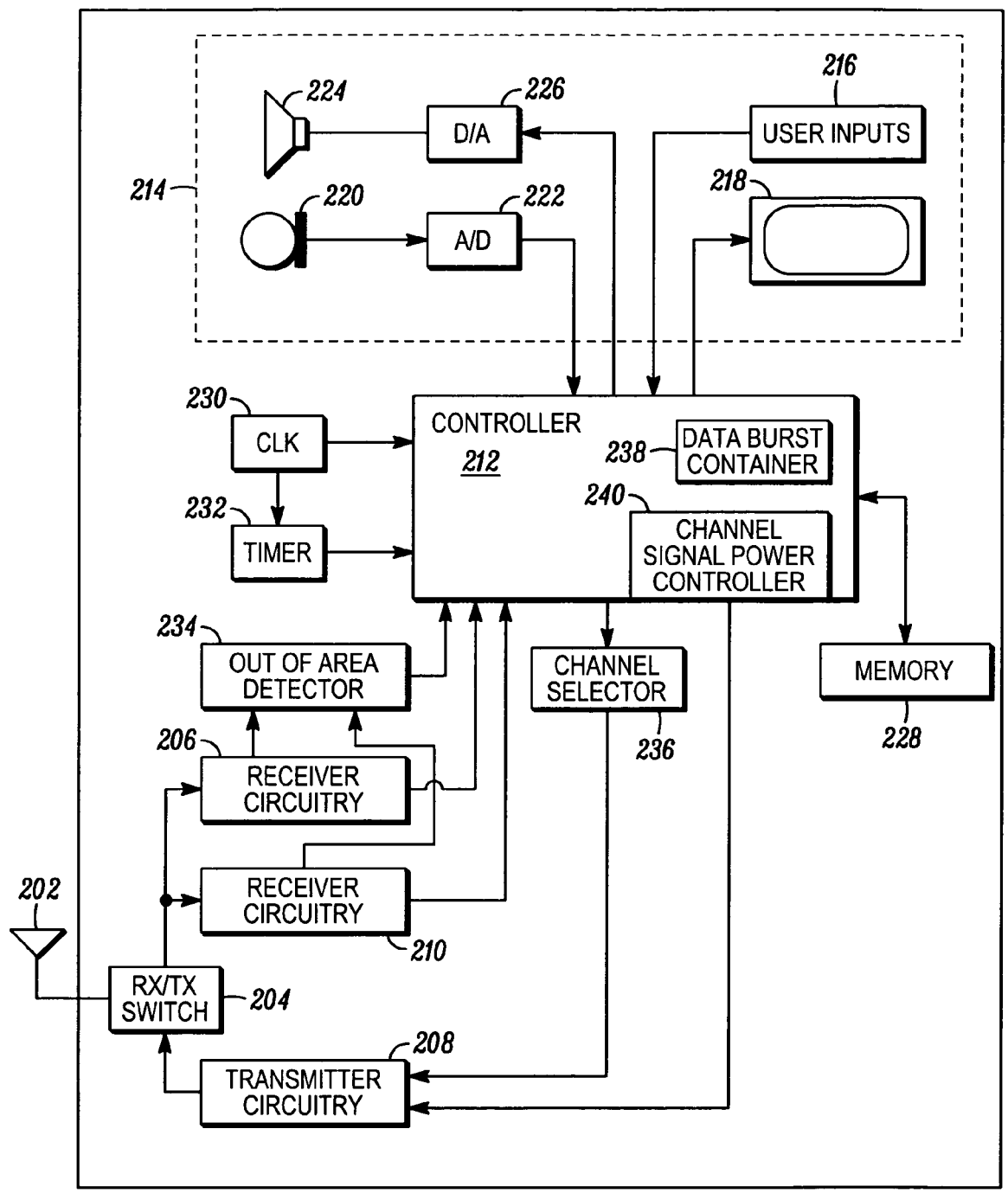
FIG. 2 is a block diagram of a portable communication device of the communication system of FIG. 1 in accordance with the embodiment of the present invention.

Referring to FIG. 2, a portable communication device 120 in accordance with the embodiment of the present invention is shown. The portable communication device 120 includes an antenna 202 for receiving and transmitting radio frequency (RF) signals. A receive/transmit switch 204 selectively couples the antenna 202 to first receiver circuitry 206 and transmitter circuitry 208 in a manner familiar to those skilled in the art. The receive/transmit switch 204 may also consist of diplex circuitry to connect the antenna 202 to the receivers 206, 210 and transmitter 208 as is well known to those skilled in the art. In accordance with the present invention, second receiver circuitry 210 is also coupled to the receive/transmit switch 204. The second receiver 210 may also be connected to a second antenna instead of the receive/transmit switch 204 for reception of signals from a different communication system (e.g., a local or WiFi communication system). The first receiver circuitry 206 and the second receiver circuitry 210 demodulate and decode the RF signals to derive information and are coupled to a controller 212 for providing the decoded information thereto for utilization thereby in accordance with the function(s) of the portable communication device 120. The controller 212 also provides information to the transmitter circuitry 208 for encoding and modulating information into RF signals for transmission from the antenna 202. In accordance with the present invention, the portable communication device 120 includes diversity receivers whereby the first receiver circuitry 206 and the transmitter circuitry 208 could support a broadcast channel on a first frequency, while the second receiver circuitry 210 could be tuned to a second channel.

The controller 212 is coupled to user interface circuitry 214 including, for example, a display 218 for presenting video output to a user, user controls 216, such as a keypad, for receiving user input thereon, a microphone 220 for receiving voice input which is converted to digital signals by an analog-to-digital (A/D) converter 222, and a speaker 224 for providing audio output to the user after passing signals through a digital-to-analog (D/A) converter 226.

The controller 212 is further coupled to a nonvolatile memory device 228 for storing information therein and for retrieving and utilizing information therefrom. Additionally, the controller 212 is coupled to a clock 230 for receiving a clock signal therefrom and to a registration timer 232 for providing a signal to the controller 212 after a predetermined time has passed after registering with the base station 110 (FIG. 1).

An out of area detector 234 monitors the strength of the received signals at the first and/or second receiver circuitry 206, 210 to determine when the portable communication device 120 is moving out of a coverage area 125 of one of the plurality of base stations 110 (FIG. 1). Additionally, the controller 212 signals a channel selector 236 to switch the operational channel of the transmitter circuitry 208. In accordance with the present invention, the channel selector 236 can switch the transmitter circuitry 208 from transmitting signals on the reverse link access channel of the broadcast channel to transmitting on the second channel.

In addition to other functionality, the controller 212 includes a databurst container 238 for generating packet information for providing to the transmitter circuitry 208 for transmission of a databurst message as a packet of information multiplexed with voice information. The controller 212 further includes a channel signal power controller 240 for controlling the power of the signal provided to the transmitter circuitry 208 when the transmitter circuitry 208 is tuned to the second channel.

Figures 3, 3A, 3B:
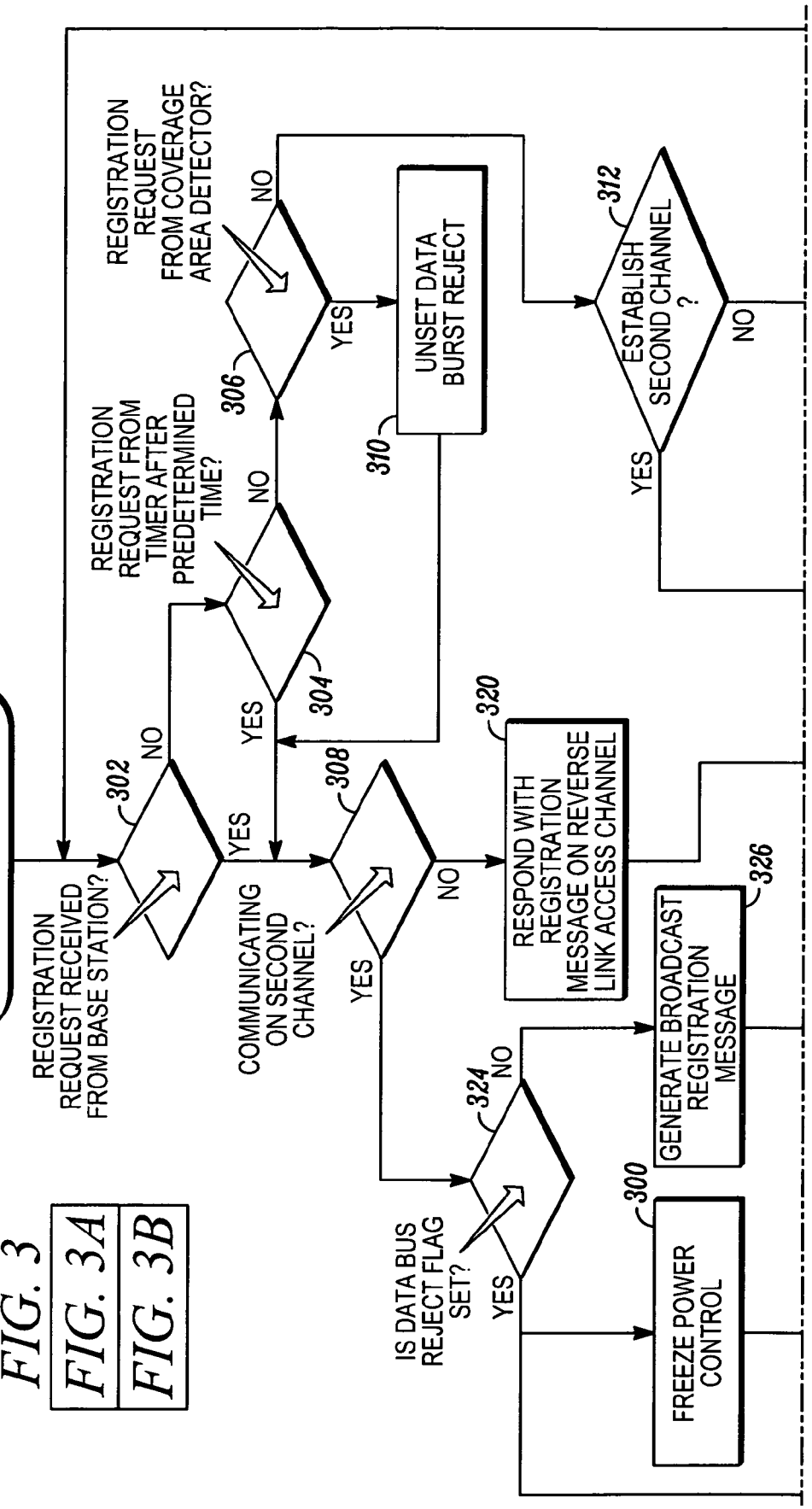
FIG. 3, comprising
FIGS. 3A and 3B, is a flowchart of the broadcast registration maintenance operation of the portable communication device of FIG. 2 in accordance with the embodiment of the present invention.
Figure 3B:
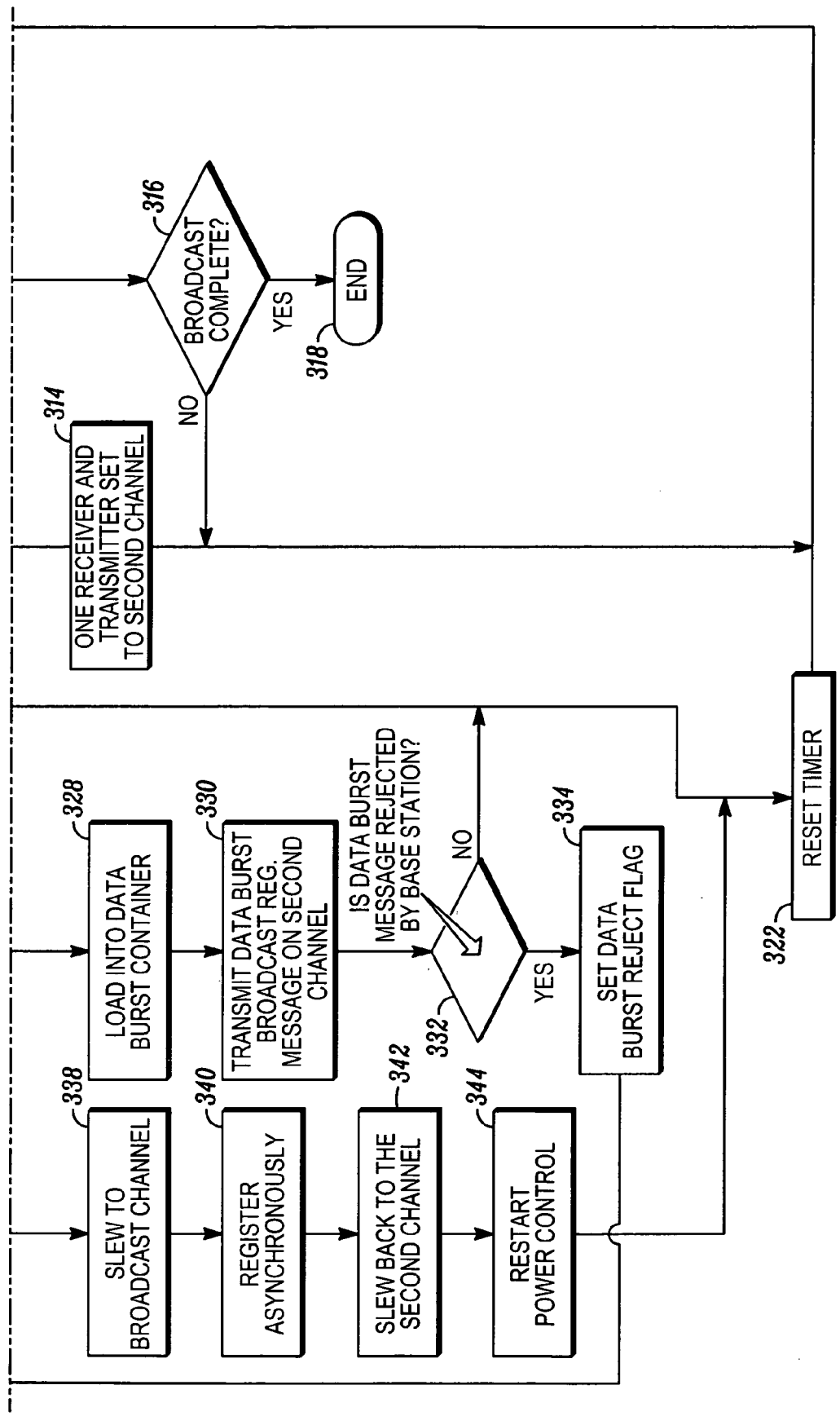

When receiving broadcast signals, the portable communication device 120 must periodically register with one of the plurality of base stations 110 to continue to receive the broadcast signals. The operation of the broadcast registration maintenance routine 300 of the controller 212 is depicted in the flowchart of FIGS. 3A and 3B. Initially, the controller 212 determines whether a predetermined event requiring registration of the portable communication device 120 on the broadcast channel has been detected by determining whether a registration request message has been received from the base station 302 requiring the portable communication device 120 to register on the broadcast channel, or determining whether a signal from the timer 232 indicates that a predetermined time has passed since a previous registration 304, or determining whether a signal from the out of area detector 234 indicates that the portable communication device 120 is moving out of a coverage area 125 of the one of the plurality of base stations 110 with which the portable communication device 120 is registered 306. When one of the predetermined events has been detected 302, 304, 306, processing next determines whether the portable communication device 120 is communicating on a second channel 308, such as a voice channel.

Not all of the plurality of base stations support databurst communication. A databurst reject flag can be set to indicate the one of the plurality of base stations 110 with which the portable communication device 120 is communicating does not support databurst communication. When processing determines that a signal from the out of area detector 234 indicates that the portable communication device 120 is moving out of a coverage area 125 of the one of the plurality of base stations 110 with which the portable communication device 120 is registered 306, the databurst reject flag is unset 310 before the second channel communication determining step 308.

If none of the predetermined events has been detected 302, 304, 306, processing determines whether the portable communication device 120 wishes to establish communication on a second channel 312 while receiving the broadcast signals, such as when the user inputs a number to initiate a telephone call. If the portable communication device 120 wishes to make a call 312, a second channel (e.g., a voice channel) is established 314 with the transmitter circuitry 208 and the second receiver circuitry 210, while the broadcast channel is maintained on the first receiver circuitry 206. Processing then returns to determine if one of the predetermined events has been detected 302, 304, 306.

If none of the predetermined events has been detected 302, 304, 306, and a call is not being established 312, processing determines whether the broadcast is completed 316 by, for example, determining whether the broadcast signals have ceased. When the broadcast terminates 316, registration on the broadcast channel does not need to be maintained and the broadcast channel registration maintenance routine ends 318. If the broadcast is not complete 316, processing returns to determine if one of the predetermined events has been detected 302, 304, 306.

After one of the predetermined events has been detected 302, 304, 306, if the controller 212 determines that the portable communication device 120 is not communicating on a second channel 308, the transmitter circuitry 208 is free so the portable communication device 120 can be registered on the broadcast channel by transmitting a registration message on the reverse link access channel 320. The timer 232 is then reset 322 to begin measuring the predetermined time to transmission of the next registration message. Processing then returns to await detection of one of the predetermined events 302, 304, 306, a request to establish a second channel 312 or completion of the broadcast signals on the broadcast channel 316.

If, on the other hand, the controller 212 determines that the portable communication device 120 is communicating on a second channel 308, the databurst reject flag is checked to determine if it is set 324 indicating that the base station does not support databurst communication. If the databurst reject flag is not set 324, the broadcast registration message is generated 326 and loaded 328 into the databurst container 238. In accordance with the present invention, the databurst container 238 for broadcast registration generates a packet of information as a databurst broadcast registration message 328. The databurst broadcast registration message is then multiplexed with second channel information and provided to the transmitter circuitry 208 for transmission therefrom on the second channel 330. Specifically, the burst type 000111 parameter for Third generation CDMA2000 (currently unassigned) could be assigned to "Broadcast Support" (see Table 4.1-1 on page 4-1 of Standard C.R1001-D, 3GPP2) and the databurst container 238 would packetize the broadcast registration message into a packet of information and the packet of information would be transmitted over the voice channel using dim_burst/Blank_burst as provided in existing standards 330.

Next the controller 212 determines from information received whether the base station has rejected the databurst broadcast registration message 332. Alternatively, the controller 212 may have set the databurst reject flag if the controller 212 has determined that the base station does not accept databurst broadcast registrations (e.g., if the base station advertises that it will not accept databurst broadcast registrations). If the base station does not reject the databurst broadcast registration message transmitted on the second channel 332, the timer 232 is reset 322 and processing returns to await detection of one of the predetermined events 302, 304, 306, a request to establish a second channel 312 or completion of the broadcast signals on the broadcast channel 316. If the base station rejects the databurst broadcast registration message transmitted on the second channel 332 or if the base station advertises that it will not accept databurst broadcast registrations, the databurst reject flag is set 334; and the portable communication device is asynchronously registered with the base station.

Asynchronous registration is utilized when the databurst reject flag is set 324, 334. First, the controller 212 freezes 336 the channel signal power controller 240. Then, the controller 212 signals the channel selector 236 to switch (i.e., slew) the transmitter circuitry 208 from the second channel to the broadcast reverse link access channel 338. Next, the controller 212 provides an asynchronous registration message to the transmitter circuitry 208 for transmission on the reverse link access channel 340 after which the controller 212 signals the channel selector 236 to slew the transmitter circuitry from the reverse link access channel back to the second channel 342. The controller 212 then restarts 344 the channel signal power controller 240. The power control may be restarted at the level it was frozen at, at an average level over a time period such as 20 mS, or one of these levels plus an offset, such as 5 dB. Asynchronous registration from step 336 to step 344 in accordance with the present invention takes less than two seconds and is barely noticeable to the user on the second channel.

After asynchronous registration, the timer 232 is reset 322 and processing returns to await detection of one of the predetermined events 302, 304, 306, a request to establish a second channel 312 or completion of the broadcast signals on the broadcast channel 316.

While at least one exemplary embodiment has been presented in the foregoing detailed description of the invention, it should be appreciated that a vast number of variations exist. For example, a voice channel may exist on a first system, such as a CDMA cellular communication system and a broadcast channel may exist on a second system such as WiFi local communication system. It is also to be understood that the voice channel could refer to any data channel which communicates information to the mobile device. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for registering a portable communication device on a broadcast channel in a communication system comprising a portable communication device capable of receiving broadcast information on a first channel and for also communicating on a second channel while receiving the broadcast information on the first channel, the method comprising the steps of:
   detecting a predetermined event requiring registration of the portable communication device on the first channel while receiving the broadcast information on the first channel;
   determining, in response to detection of the predetermined event, whether the portable communication device is communicating on the second channel at a time when the predetermined event is detected;
   registering the portable communication device on the first channel by transmitting a registration message on a reverse link of the first channel if the communication device is not communicating on the second channel at the time when the predetermined event is detected; and
   registering the portable communication device on the first channel by transmitting a registration message on the second channel if the portable communication device is communicating on the second channel at the time when the predetermined event is detected.

2. The method of claim 1 wherein the step of detecting the predetermined event comprises the step of determining whether a message has been received by the portable communication device on the first channel requiring the portable communication device to register on the first channel.

3. The method of claim 1 wherein the step of detecting the predetermined event comprises the step of determining whether a predetermined time has passed since a previous registration on the first channel.

4. The method of claim 1 wherein the step of detecting the predetermined event comprises the step of determining whether the portable communication device is moving out of a coverage area of a base station transmitting the broadcast information on the first channel.

5. The method of claim 1 wherein the step of registering the portable communication device on the first channel comprises the step of transmitting a databurst broadcast registration on the second channel to a base station if the portable communication device is communicating on the second channel at the time when the predetermined event is detected which requires registration of the portable communication device on the first channel.

6. The method of claim 5 wherein the step of transmitting a databurst broadcast registration comprises the steps of:
   generating a broadcast registration message if the portable communication device is communicating on the second channel at the time when the predetermined event is detected which requires registration of the portable communication device on the first channel;
   loading the broadcast registration message into a databurst container; and
   transmitting the broadcast registration message as a packet of information multiplexed with other information on the second channel to the base station.

7. The method of claim 5 further comprising the steps of:
   determining that the base station has rejected the databurst broadcast registration on the second channel; and
   asynchronously registering the portable communication device with the base station on the first channel.

8. The method of claim 7 wherein the step of asynchronously registering the portable communication device comprises the steps of:
   freezing transmitter power control;
   slewing to the first channel;
   transmitting an asynchronous registration message on the first channel;
   slewing back to the second channel; and
   restarting transmitter power control.

9. The method of claim 5 further comprising the steps of:
   determining that the base station will not accept a databurst broadcast registration on the second channel; and
   asynchronously registering the portable communication device with the base station on the first channel.

10. A portable communication device comprising:
    at least one antenna for receiving radio frequency (RF) signals and for transmitting RF signals therefrom;
    first receiver circuitry coupled to the at least one antenna for receiving, demodulating and decoding RF signals on a broadcast channel to derive broadcast information therefrom, the broadcast channel having a reverse link access channel associated therewith;
    second receiver circuitry coupled to the at least one antenna for receiving, demodulating and decoding RF signals on a second channel to derive second channel information therefrom;
    transmitter circuitry coupled to the at least one antenna for encoding, modulating and transmitting RF signals on either the second channel or the reverse link access channel;
    a channel selector coupled to the transmitter circuitry for selecting either the second channel or the reverse link access channel for transmitting RF signals thereon;
    user interface devices for presenting the second channel information and the broadcast information to a user, wherein the user interface devices also receive inputs from the user; and
    a controller coupled to the first receiver circuitry and the second receiver circuitry for receiving the broadcast information and the second channel information therefrom, the controller also coupled to the user interface devices for providing the broadcast information and the second channel information thereto and for receiving the user inputs therefrom, wherein the controller determines when a predetermined event requiring registration of the portable communication device on the broadcast channel is detected and, in response thereto, provides a signal to the channel selector to transmit a registration message on the reverse link access channel for registering on the broadcast channel when the portable communication device is not communicating on the second channel when the predetermined event is detected and provides a signal to the channel selector to transmit a registration message on the second channel for registering on the broadcast channel when the portable communication device is communicating on the second channel when the predetermined event is detected.

11. The portable communication device of claim 10 wherein the controller determines that a predetermined event requiring registration of the portable communication device on the broadcast channel has been detected in response to determining that a registration request message has been received on the broadcast channel.

12. The portable communication device of claim 10 further comprising a timer coupled to the controller, wherein the controller determines that a predetermined event requiring registration of the portable communication device on the broadcast channel has been detected in response to a signal from the timer that a predetermined time has passed since a previous registration.

13. The portable communication device of claim 10 further comprising an out of coverage area detector coupled to the first receiver circuitry and the controller for determining when the portable communication device is out of range of a base station communicating on the broadcast channel, wherein the controller determines that a predetermined event requiring registration of the portable communication device on the broadcast channel has been detected in response to a signal from the out of coverage area detector that the portable communication device is moving out of a coverage area of the base station.

14. The portable communication device of claim 10 wherein the controller comprises a databurst container for generating a packet of information from the registration message, the controller providing the packet of information to the transmitter circuitry for transmission of a databurst broadcast registration as the packet of information multiplexed with other information for transmission on the second channel to register on the broadcast channel when the portable communication device is communicating on the second channel.

15. The portable communication device of claim 14 wherein the controller further comprises a channel signal power controller for controlling the signal power on the second channel, and wherein the controller, in response to determining that the base station has rejected the databurst broadcast registration on the second channel, (a) freezes the second channel signal power controller, (b) signals the channel selector to switch the transmitter circuitry from the second channel to the reverse link access channel, (c) provides an asynchronous registration message to the transmitter circuitry for transmission on the reverse link access channel therefrom, (d) signals the channel selector to switch the transmitter circuitry from the reverse link access channel back to the second channel, and (e) restarts the second channel signal power controller.

16. The portable communication device of claim 14 wherein the controller further comprises a second channel signal power controller for controlling the signal power on the second channel, and wherein the controller, in response to determining that the base station will not accept a databurst broadcast registration on the second channel, (a) freezes the second channel signal power controller, (b) signals the channel selector to switch the transmitter circuitry from the second channel to the reverse link access channel, (c) provides an asynchronous registration message to the transmitter circuitry for transmission on the reverse link access channel therefrom, (d) signals the channel selector to switch the transmitter circuitry from the reverse link access channel back to the second channel, and (e) restarts the second channel signal power controller.

17. A communication system comprising:
a plurality of base stations for communicating on either broadcast channels and second channels, each of the plurality of base stations having a coverage area associated therewith for communicating on the broadcast channels and the second channels therein; and
a portable communication device for receiving radio frequency (RF) signals from and transmitting RF signals to one of the plurality of base stations, the portable communication comprising:
an antenna for receiving the RF signals from and transmitting the RF signals to the one of the plurality of base stations;
first receiver circuitry coupled to the antenna for receiving, demodulating and decoding RF signals on one of the broadcast channels to derive broadcast information therefrom, the one of the broadcast channels having a reverse link access channel associated therewith;
second receiver circuitry coupled to the antenna for receiving, demodulating and decoding RF signals on one of the second channels to derive information therefrom;
transmitter circuitry coupled to the antenna for encoding, modulating and transmitting RF signals on either the one of the second channels or the reverse link access channel;
a channel selector coupled to the transmitter circuitry for selecting either the one of the second channels or the reverse link access channel for transmitting RF signals thereon;
user interface devices for presenting the second information and the broadcast information to a user, wherein the user interface devices also receive inputs from the user; and
a controller coupled to the first receiver circuitry and the second receiver circuitry for receiving the broadcast information and the second channel information therefrom, the controller also coupled to the user interface devices for providing the broadcast information and the second channel information thereto and for receiving the user inputs therefrom, wherein the controller determines when a predetermined event requiring registration of the portable communication device with the one of the plurality of base stations on the one of the broadcast channels is detected and, in response thereto, provides a signal to the channel selector to transmit a registration message for registering on the one of the broadcast channels to the one of the plurality of base stations on the reverse link access channel when the portable communication device is not communicating on the one of the second channels when the predetermined event is detected and provides a signal to the channel selector to transmit a registration message for registering on the one of the broadcast channels to the one of the plurality of base stations on the second channel when the portable communication device is communicating on the one of the second channels when the predetermined event is detected.

18. The communication system of claim 17 wherein the portable communication device further comprises a timer coupled to the controller and an out of coverage area detector coupled to the first and second receiver circuitry and the controller for determining when the portable communication device is moving out of the coverage area of the one of the plurality of base stations, and wherein the controller determines that a predetermined event requiring registration of the portable communication device on the one of the broadcast channels has been detected in response to determining that one of (a) a registration request message has been received on the one of the broadcast channels from one of the plurality of base stations, (b) a signal has been received from the timer that a predetermined time has passed since a previous registration on the one of the broadcast channels, and (c) a signal has been received from the out of coverage area detector that the portable communication device has moved out of the coverage area of the one of the plurality of base stations.

19. The communication system of claim 17 wherein the controller comprises a databurst container for generating a packet of information from the registration message, the controller providing the packet of information to the transmitter circuitry for transmission of a databurst broadcast registration for registering on the one of the broadcast channels as a packet of information multiplexed with second channel information on the one of the second channels when the portable communication device is communicating on the one of the second channels.

20. The communication system of claim 19 wherein the controller further comprises a second channel signal power controller, and wherein the controller determines one of (i) that the one of the plurality of base stations rejects the databurst broadcast registration on the one of the second channels and (ii) that the one of the plurality of base stations does not accept databurst broadcast registrations on the one of the second channels, and wherein the controller (a) freezes the second channel signal power controller, (b) signals the channel selector to switch the transmitter circuitry from the one of the second channels to the reverse link access channel, (c) provides an asynchronous registration message to the transmitter circuitry for transmission on the reverse link access channel therefrom, (d) signals the channel selector to switch the transmitter circuitry from the reverse link access channel back to the one of the second channels, and (e) restarts the second channel signal power controller.

* * * * *